United States Patent
Machida

(10) Patent No.: US 10,845,128 B2
(45) Date of Patent: Nov. 24, 2020

(54) HEAT PIPE

(71) Applicant: SHINKO ELECTRIC INDUSTRIES CO., LTD., Nagano (JP)

(72) Inventor: Yoshihiro Machida, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 14 days.

(21) Appl. No.: 15/896,578

(22) Filed: Feb. 14, 2018

(65) Prior Publication Data

US 2018/0306521 A1 Oct. 25, 2018

(30) Foreign Application Priority Data

Apr. 21, 2017 (JP) ................................. 2017-084258

(51) Int. Cl.
*F28D 15/02* (2006.01)
*F28D 15/04* (2006.01)

(52) U.S. Cl.
CPC ......... *F28D 15/0266* (2013.01); *F28D 15/02* (2013.01); *F28D 15/0233* (2013.01); *F28D 15/0283* (2013.01); *F28D 15/046* (2013.01); *B23P 2700/09* (2013.01)

(58) Field of Classification Search
CPC .. F28D 15/0266; F28D 15/02; F28D 15/0283; F28D 15/0233; F28D 15/046; B23P 2700/09
See application file for complete search history.

(56) References Cited

U.S. PATENT DOCUMENTS

| | | | |
|---|---|---|---|
| 6,508,302 B2 | 1/2003 | Ishida et al. | |
| 7,051,793 B1 | 5/2006 | Schulz-Harder | |
| 2002/0135979 A1 | 9/2002 | Estes et al. | |
| 2010/0008043 A1 | 1/2010 | Yajima et al. | |
| 2010/0059212 A1* | 3/2010 | Moon | F28D 15/0233 165/133 |
| 2016/0193702 A1* | 7/2016 | Yang | B23P 15/26 29/890.054 |
| 2016/0259383 A1* | 9/2016 | Shioga | F28D 15/0266 |

FOREIGN PATENT DOCUMENTS

JP    H11-183069    7/1999

OTHER PUBLICATIONS

Extended European search report issued with respect to the corresponding European patent application No. 18157243.9.

* cited by examiner

*Primary Examiner* — Jon T. Schermerhorn, Jr.
(74) *Attorney, Agent, or Firm* — IPUSA, PLLC

(57) ABSTRACT

A heat pipe includes an inlet port. The inlet port includes an unsealed part and a sealed part that include metal layers that are a first outermost layer, intermediate layers stacked on the first outermost layer, and a second outermost layer stacked on the intermediate layers. In the unsealed part, the intermediate layers include respective openings and respective first and second walls on first and second opposite sides, respectively, of the openings. The openings form an injection channel defined by the first and second outermost layers and the first and second walls of the intermediate layers. The inner wall faces of the first walls and the inner wall faces of the second walls of at least two adjacent intermediate layers form a first step and a second step, respectively. In the sealed part, each metal layer contacts one or more of other metal layers to hermetically seal the inlet port.

6 Claims, 10 Drawing Sheets

HEAT PIPE

CROSS-REFERENCE TO RELATED APPLICATION

This application is based upon and claims the benefit of priority of the prior Japanese Patent Application No. 2017-084258, filed on Apr. 21, 2017, the entire contents of which are incorporated herein by reference.

FIELD

A certain aspect of the embodiments discussed herein is related to heat pipes.

BACKGROUND

Heat pipes are known as devices to cool heat generating components installed in electronic devices, such as a central processing unit (CPU). Heat pipes are devices that transfer heat using a phase transition of a working fluid.

A working fluid is injected into the heat pipe through the inlet port of the heat pipe, and the inlet port is thereafter sealed. The end of the inlet port may be sealed by a first method such as welding, soldering, or silver brazing or a second method such as stamping the end with a high load. (See, for example, Japanese Patent No. 3045491.)

SUMMARY

According to an aspect of the present invention, a heat pipe includes an inlet port for injecting a working fluid. The inlet port includes an unsealed part and a sealed part that connect to each other. The unsealed part and the sealed part include multiple metal layers that are a first outermost layer, intermediate layers stacked on the first outermost layer, and a second outermost layer stacked on the intermediate layers. In the unsealed part, the intermediate layers include respective openings open to the first and second outermost layers, and respective first and second walls on first and second opposite sides, respectively, of the openings. The openings of the intermediate layers form an injection channel defined by the first and second outermost layers and the first and second walls of the intermediate layers. The inner wall faces of the first walls and the inner wall faces of the second walls of at least two adjacent intermediate layers among the intermediate layers form a first step and a second step, respectively. In the sealed part, each of the metal layers contacts one or more of other metal layers among the metal layers to hermetically seal the inlet port.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

Figure 1:
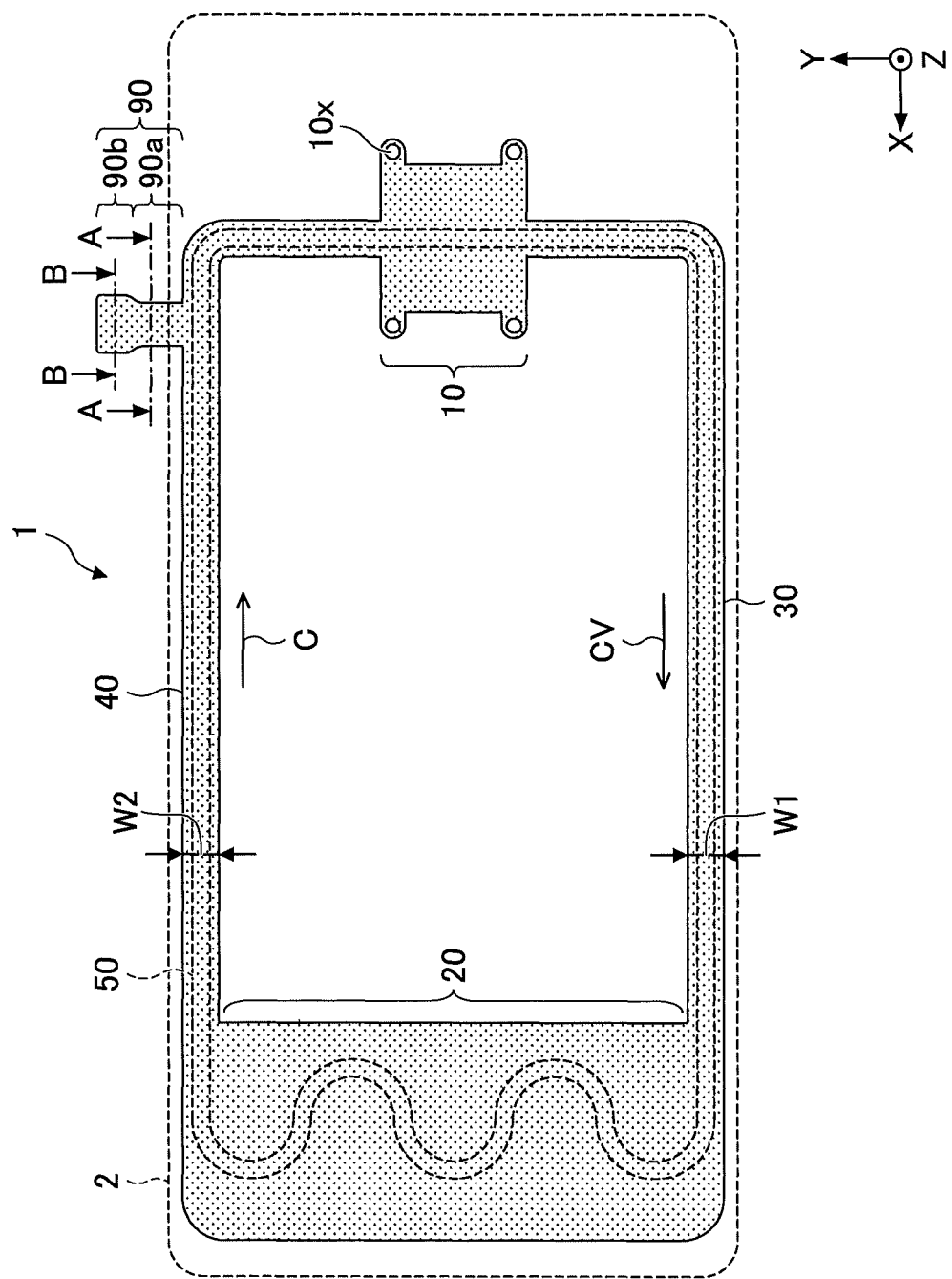
FIG. 1 is a schematic plan view of a loop heat pipe according to a first embodiment.

According to the above-described first method of sealing the end of the inlet port of a heat pipe, a metal that forms the heat pipe is joined to a different kind of metal. Therefore, the airtightness of the inlet port may degrade depending on a usage environment, and there are structural constraints such as a smaller pipe diameter to ensure sealing workability.

According to the above-described second method of sealing the end of the inlet port of a heat pipe, when the inlet port has a frame-like cross-sectional shape, the sidewalls of the inlet port serve as posts to prevent the upper portion and the lower portion of the end of the inlet port from being uniformly connected when the end of the inlet port is vertically compressed. As a result, the airtightness of the inlet port may degrade.

According to an aspect of the present invention, a heat pipe including an inlet port with better airtightness is provided.

Preferred embodiments of the present invention will be explained with reference to accompanying drawings. In the following description, the same elements or components are referred to using the same reference numeral, and a repetitive description thereof may be omitted. Furthermore, in the drawings, an XYZ coordinate system, which is a Cartesian coordinate system, is defined as illustrated, where the positive half (side) of each of the X-axis, Y-axis, and Z-axis is indicated by an arrow. The direction indicated by the arrow X ("X direction") and a direction opposite to the X direction are X-axis directions, which are lateral directions. The direction indicated by the arrow Z ("Z direction") and a direction opposite to the Z direction are Z-axis directions, which are vertical directions. The X-axis directions and the Z-axis directions may be collectively referred to as "X-axis direction" and "Z-axis direction," respectively, where appropriate.

[a] First Embodiment

A first embodiment illustrates an application of the present invention to a loop heat pipe.

First, a structure of a loop heat pipe according to the first embodiment is described. FIG. 1 is a schematic plan view of a loop heat pipe according to the first embodiment.

Referring to FIG. 1, a loop heat pipe 1 includes an evaporator 10, a condenser 20, a vapor pipe 30, a liquid pipe 40, and an inlet port 90. The loop heat pipe 1 may be accommodated in, for example, a mobile electronic device 2 such as a smartphone or a tablet terminal.

According to the loop heat pipe 1, the evaporator 10 is configured to vaporize a working fluid C to generate vapor CV. The condenser 20 is configured to condense the vapor CV of the working fluid C. The evaporator 10 and the condenser 20 are connected by the vapor pipe 30 and the liquid pipe 40. The vapor pipe 30 and the liquid pipe 40 form a loop flow path 50 in which the working fluid C or the vapor CV flows.

The inlet port 90 is an entrance for injecting the working fluid C into the liquid pipe 40. The inlet port 90 is hermetically sealed after injection of the working fluid C. The inlet port 90 is described in detail below. While connected to the liquid pipe 40 according to this embodiment, the inlet port 90 may alternatively be connected to the condenser 20 or the vapor pipe 30. In this case, the working fluid C injected into the condenser 20 or the vapor pipe 30 flows through the flow path 50 to travel into the liquid pipe 40.

Figure 2:
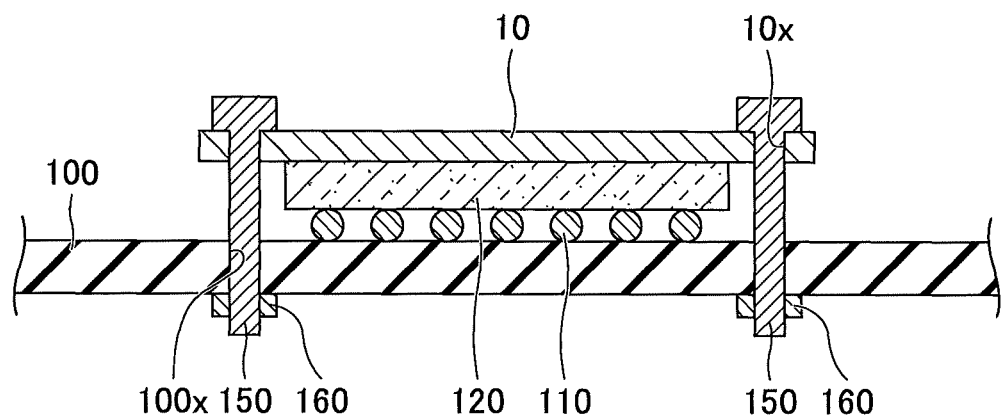
FIG. 2 is a cross-sectional view of an evaporator and its vicinity of the loop heat pipe according to the first embodiment.

FIG. 2 is a cross-sectional view of the evaporator 10 and its vicinity of the loop heat pipe 1 according to the first embodiment. Referring to FIGS. 1 and 2, for example, four through holes 10x are formed in the evaporator 10. The evaporator 10 is fixed to a circuit board 100 by inserting bolts 150 into the through holes 10x formed in the evaporator 10 and through holes 100x formed in the circuit board 100 and tightening the bolts 150 with nuts 160 on the lower surface of the circuit board 100.

For example, a heat generating component 120 such as a CPU is mounted on the circuit board 100 through bumps 110. The upper surface of the heat generating component 120 adheres to the lower surface of the evaporator 10. The working fluid C in the evaporator 10 vaporizes because of heat generated in the heat generating component 120, so that the vapor CV is generated.

Referring to FIG. 1, the vapor CV generated in the evaporator 10 is guided to the condenser 20 through the vapor pipe 30 to condense in the condenser 20. As a result, heat generated in the heat generating component 120 migrates to the condenser 20 to prevent an increase in the temperature of the heat generating component 120. The working fluid C condensed in the condenser 20 is guided to the evaporator 10 through the liquid pipe 40. A width W1 of the vapor pipe 30 may be, for example, approximately 8 mm. A width W2 of the liquid pipe 40 may be, for example, approximately 6 mm.

The working fluid C is not limited to a particular kind, but is preferably a fluid of a high vapor pressure and a high latent heat of vaporization to efficiently cool the heat generating component 120 with latent heat of vaporization. Examples of such a fluid include ammonia, water, chlorofluorocarbon, alcohol, and acetone.

The evaporator 10, the condenser 20, the vapor pipe 30, and the liquid pipe 40 may have a structure in which multiple metal layers are stacked. The metal layers are, for example, copper layers, which have good thermal conductivity, and are directly joined to one another by, for example, solid-state welding. The thickness of each metal layer may be, for example, approximately 50 μm to approximately 200 μm.

The metal layers are not limited to copper layers, and may be, for example, stainless steel layers, aluminum layers, or magnesium alloy layers. The number of metal layers to be stacked is not limited in particular.

Figure 3:
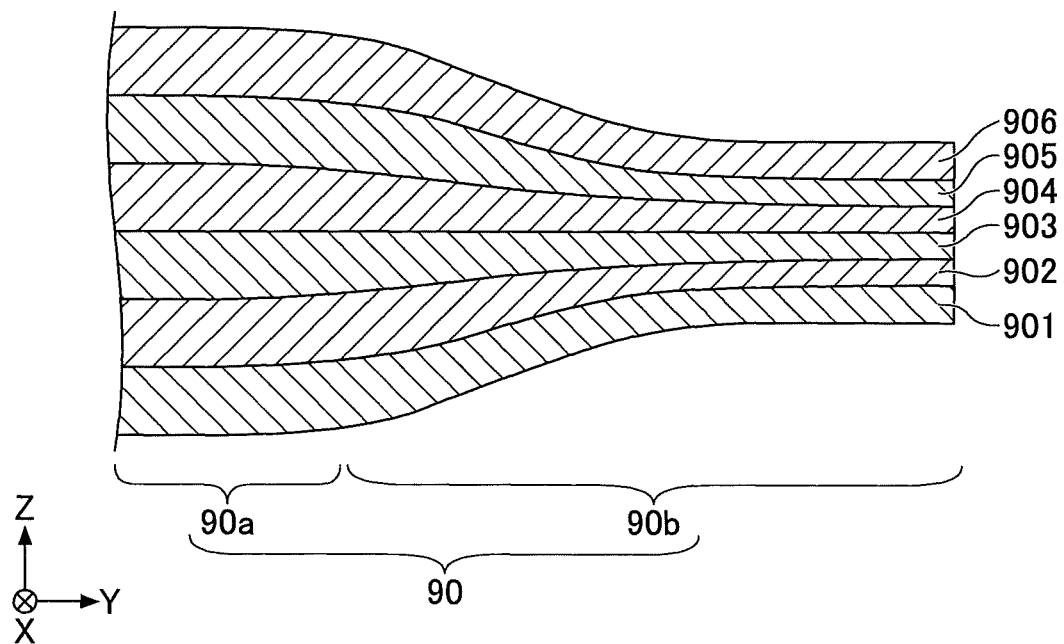
FIG. 3 is a side view of an inlet port of the loop heat pipe according to the first embodiment.
Figure 4:
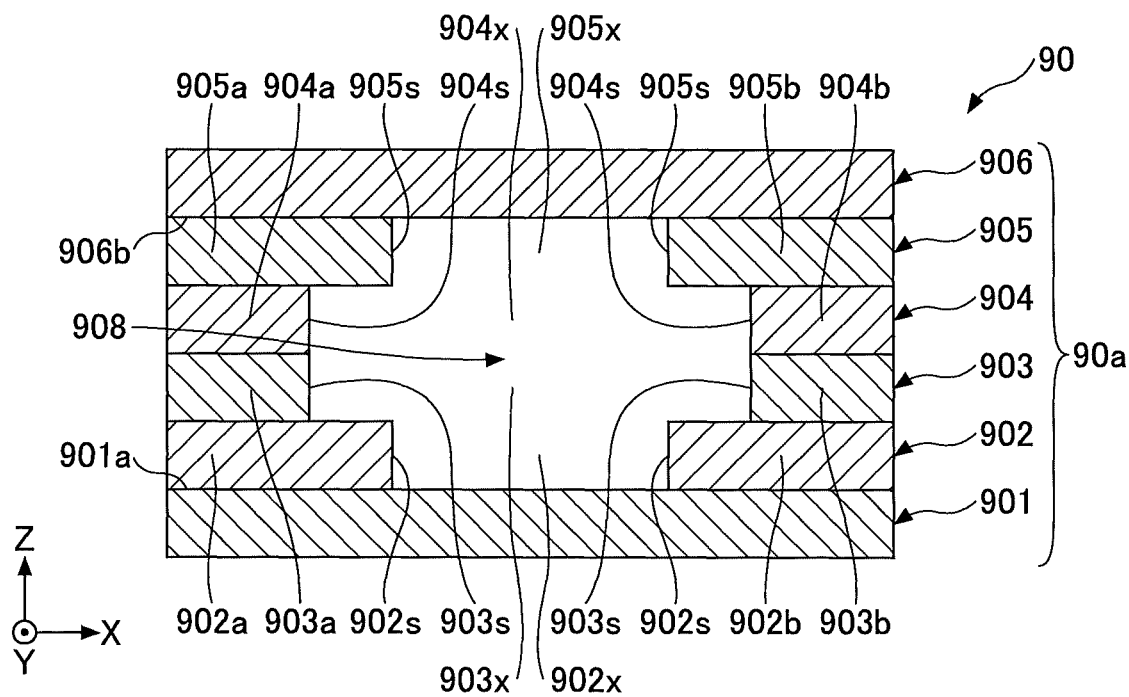
FIG. 4 is a cross-sectional view of the inlet port, taken along the line A-A of FIG. 1.
Figure 5:
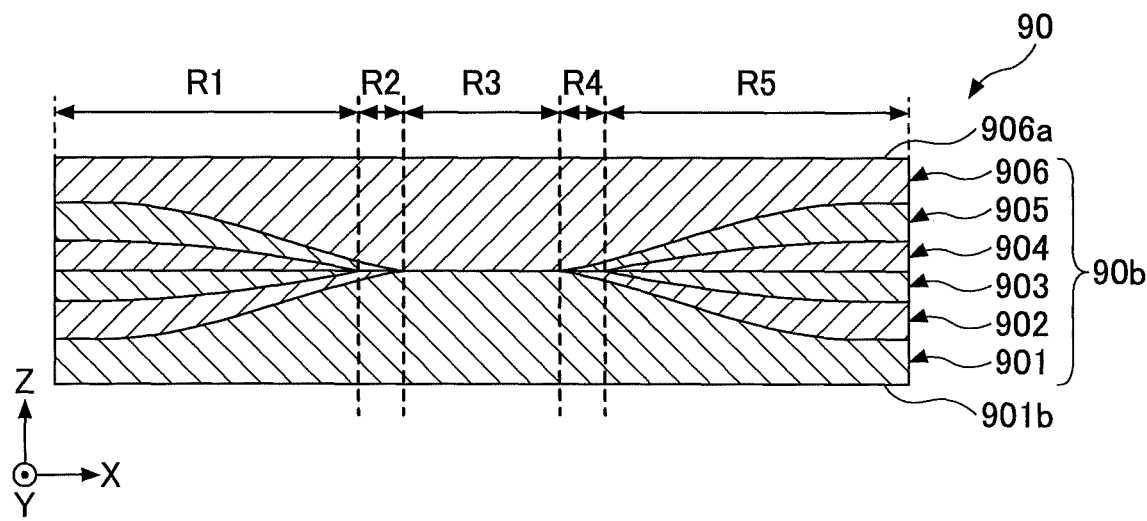
FIG. 5 is a cross-sectional view of the inlet port, taken along the line B-B of FIG. 1.

FIGS. 3 through 5 are diagrams illustrating a structure of the inlet port 90. FIG. 3 is a side view of the inlet port 90. FIG. 4 is a cross-sectional view of the inlet port 90, taken along the line A-A of FIG. 1. FIG. 5 is a cross-sectional view of the inlet port 90, taken along the line B-B of FIG. 1.

Referring to FIGS. 1 and 3 through 5, the inlet port 90, which protrudes from the liquid pipe 40, includes an unsealed part 90a connecting to (extending from) the liquid pipe 40 and a sealed part 90b connecting to (extending from) the unsealed part 90a. The liquid pipe 40, the unsealed part 90a, and the sealed part 90b are formed together as one piece.

The shape of the inlet port 90 at the time of injecting the working fluid C into the liquid pipe 40 is substantially maintained in the unsealed part 90a. The sealed part 90b, which has the same shape as the unsealed part 90a at the time of injecting the working fluid C into the liquid pipe 40, is compressed to be flat after injection of the working fluid C into the liquid pipe 40. By compressing the sealed part 90b flat, the inlet port 90 can be hermetically sealed to prevent the working fluid C injected into the liquid pipe 40 from leaking outside.

The inlet port 90 may have, for example, a structure in which six layers, namely, an outermost metal layer 901, an intermediate metal layer 902, an intermediate metal layer 903, an intermediate metal layer 904, an intermediate metal layer 905, and an outermost metal layer 906, are successively stacked in order. The outermost metal layers 901 and 906 (outermost layers) and the intermediate metal layers 902 through 905 (intermediate layers) may be collectively referred to simply as "metal layers 901 through 906" where no particular distinction is necessary between the outermost metal layers 901 and 906 and the intermediate metal layers 902 through 905.

The outermost metal layers 901 and 906 are outside layers positioned at the bottom and the top, respectively, of a stack of the metal layers of the inlet port 90, and the intermediate metal layers 902 through 905 are inside layers sandwiched between the outermost metal layers 901 and 906. The outermost metal layers 901 and 906 have a solid shape in which no holes or grooves are formed, and form part of the exterior wall of the inlet port 90.

The number of metal layers to be stacked, however, is not limited to six, and may be at least four. That is, at least two intermediate layers may be stacked between the two outermost metal layers.

The metal layers 901 through 906 are, for example, copper layers, which have good thermal conductivity, and are directly bonded to one another by, for example, solid-state welding. The thickness of each of the metal layers 901 through 906 may be, for example, approximately 50 μm to approximately 200 μm. The metal layers 901 through 906 are not limited to copper layers, and may be, for example, stainless steel layers, aluminum layers, or magnesium alloy layers.

In the unsealed part 90a, the intermediate metal layer 902 includes a wall 902a and a wall 902b that are spaced apart laterally from each other across a predetermined opening 902x and are substantially parallel to each other. That is, the walls 902a and 902b are on the first and second opposite sides, respectively, of the opening 902x. The walls 902a and 902b have respective inner wall faces 902s that face each other across the opening 902x. The opening 902x exposes part of an upper surface 901a of the outermost metal layer 901 on which the intermediate metal layer 902 is stacked. The opening 902x is open to part of the outermost metal layer 906.

The intermediate metal layer 903 includes a wall 903a and a wall 903b that are spaced apart laterally from each other across a predetermined opening 903x and are substantially parallel to each other. That is, the walls 903a and 903b are on the first and second opposite sides, respectively, of the opening 903x. The walls 903a and 903b have respective inner wall faces 903s that face each other across the opening 903x. The opening 903x is continuous with the opening 902x, and exposes part of the walls 902a and 902b. The opening 903x is open to part of the outermost metal layer 901 and part of the outermost metal layer 906.

The intermediate metal layer 904 includes a wall 904a and a wall 904b that are spaced apart laterally from each other across a predetermined opening 904x and are substantially parallel to each other. That is, the walls 904a and 904b are on the first and second opposite sides, respectively, of the opening 904x. The walls 904a and 904b have respective inner wall faces 904s that face each other across the opening 904x. The opening 904x is continuous with the opening 903x. The opening 904x is open to part of the outermost metal layer 901 and part of the outermost metal layer 906.

The intermediate metal layer 905 includes a wall 905a and a wall 905b that are spaced apart laterally from each other across a predetermined opening 905x and are substantially parallel to each other. That is, the walls 905a and 905b are on the first and second opposite sides, respectively, of the opening 905x. The walls 905a and 905b have respective inner wall faces 905s that face each other across the opening 905x. The opening 905x is continuous with the opening 904x, and exposes part of a lower surface 906b of the outermost metal layer 906. The opening 905x is open to part of the outermost metal layer 901. Part of the walls 905a and 905b is exposed in the opening 904x.

Thus, part of the outermost metal layer 901 and part of the outermost metal layer 906 are exposed in the opening formed by the openings 902x through 905x.

The unsealed part 90a is defined by the outermost metal layers 901 and 906 and the walls 902a through 905a (first walls) and the walls 902b through 905b (second walls) of the intermediate metal layers 902 through 905. In the unsealed part 90a, the opening formed by the openings 902x through 905x of the intermediate metal layers 902 through 905 serves as an injection channel 908 through which the working fluid C is injected into the liquid pipe 40.

The walls 902a through 905a and the walls 902b through 905b of the intermediate metal layers 902 through 905 form part of the exterior wall of the inlet port 90.

In the unsealed part 90a, the inner wall faces of the walls of at least two adjacent intermediate metal layers among the intermediate metal layers 902 through 905 are laterally offset relative to each other to form a step (a stepped surface) on each side of the injection channel 908.

In the case illustrated in FIG. 4, the inner wall faces of the walls of the adjacent intermediate metal layers 902 and 903 form a step on each side of the injection channel 908. Furthermore, the inner wall faces of the walls of the adjacent intermediate metal layers 904 and 905 form a step on each side of the injection channel 908.

To be more specific, the inner wall face 902s of the wall 902a of the intermediate metal layer 902 and the inner wall face 903s of the wall 903a of the intermediate metal layer 903 form a step so that the injection channel 908 becomes wider from the outermost metal layer 901 toward the outermost metal layer 906. Furthermore, the inner wall face 902s of the wall 902b of the intermediate metal layer 902 and the inner wall face 903s of the wall 903b of the intermediate metal layer 903 form a step so that the injection channel 908 becomes wider from the outermost metal layer 901 toward the outermost metal layer 906.

Likewise, the inner wall face 904s of the wall 904a of the intermediate metal layer 904 and the inner wall face 905s of the wall 905a of the intermediate metal layer 905 form a step so that the injection channel 908 becomes wider from the outermost metal layer 906 toward the outermost metal layer 901. Furthermore, the inner wall face 904s of the wall 904b of the intermediate metal layer 904 and the inner wall face 905s of the wall 905b of the intermediate metal layer 905 form a step so that the injection channel 908 becomes wider from the outermost metal layer 906 toward the outermost metal layer 901.

In other words, the walls 902a and 902b of the intermediate metal layer 902 laterally protrude inward relative to the walls 903a and 903b of the intermediate metal layer 903, respectively. That is, the walls 903a and 903b of the intermediate metal layer 903 are laterally depressed outward relative to the walls 902a and 902b of the intermediate metal layer 902, respectively. Thus, the distance between the walls 903a and 903b is greater than the distance between the walls 902a and 902b. Likewise, the walls 905a and 905b of the intermediate metal layer 905 laterally protrude inward relative to the walls 904a and 904b of the intermediate metal layer 904, respectively. That is, the walls 904a and 904b of the intermediate metal layer 904 are laterally depressed outward relative to the walls 905a and 905b of the intermediate metal layer 905, respectively. Thus, the distance between the walls 905a and 905b is smaller than the distance between the walls 904a and 904b.

In FIG. 4, by way of example, the opening 902x and the opening 905x are illustrated as having substantially the same size, and the opening 903x and the opening 904x are illustrated as having substantially the same size. Embodiments of the present invention, however, are not limited to this configuration. For example; the opening 903x and the opening 904x may be different in size. This makes it also possible to form a step between the inner wall face 903s of the wall 903a of the intermediate metal layer 903 and the inner wall face 904s of the wall 904a of the intermediate metal layer 904 and between the inner wall face 903s of the wall 903b of the intermediate metal layer 903 and the inner wall face 904s of the wall 904b of the intermediate metal layer 904.

An unsealed part of the inlet port 90 having the same layered (laminated) structure of metal layers as the unsealed part 90a is compressed flat (in the Z-axis direction) into the sealed part 90b after injection of the working fluid C into the liquid pipe 40. The sealed part 90b is wider than the unsealed part 90a (in the X-axis direction). According to this embodiment, the shape of the sealed part 90b in the case of forming the sealed part 90b by pressing the unsealed part upward from below is illustrated. Alternatively, the sealed part 90b may be formed by pressing the unsealed part downward from above or by pressing the unsealed part from both above and below.

Referring to FIG. 5, in the sealed part 90b, each of the metal layers 901 through 906 contacts one or more of the other metal layers to hermetically seal the inlet port 90. Here, the inlet port 90 is hermetically sealed when the injection channel 908 of the unsealed part 90a is disconnected from the outside of the loop heat pipe 1. Accordingly, even if, for example, gaps are scattered between adjacent metal layers in the sealed part 90b, the inlet port 90 is hermetically sealed unless the gaps connect the injection channel 908 of the unsealed part 90a to the outside of the loop heat pipe 1.

The sealed part 90b is more easily deformable on the inner wall face side of the metal layers 901 through 906 on which side the opening is formed (that is, the injection channel 908 side) than on the outer wall face side of the metal layers 901 through 906. Therefore, many of the interfaces between metal layers ("metal layer interfaces") are inclined relative to a lower surface 901*b* of the outermost metal layer 901 and an upper surface 906*a* of the outermost metal layer 906. Furthermore, some of the metal layers 901 through 906 gradually become thinner from the outer wall face side to the inner wall face side.

The sealed part 90*b* includes three or more regions that are different in the number of metal layer interfaces in a stacking direction in which the outermost metal layer 901, the intermediate metal layers 902 through 905, and the outermost metal layer 906 are stacked (that is, in the Z direction). The three or more regions are arranged laterally or in a direction perpendicular to the stacking direction (namely, in the X-axis direction).

For example, in regions R1 and R5, there are five metal layer interfaces. These regions R1 and R5 are formed by compressing a stack of the six metal layers. Therefore, the interfaces between adjacent metal layers existing before compression remain in the regions R1 and R5 after compression.

Regions R2, R3 and R4 are formed by compressing part of the inlet port 90 in which an opening is formed. Therefore, the number of metal layer interfaces is less than five in these regions R2 through R4. Specifically, in the regions R2 and R4, there are three metal layer interfaces. The interface between the outermost metal layer 901 and the intermediate metal layer 902, which are adjacent before compression, and the interface between the outermost metal layer 906 and the intermediate metal layer 905, which are adjacent before compression, remain as two of the three metal layer interfaces after compression. The other interface is a new interface formed by the contact of at least part of a surface of the intermediate metal layer 902 and at least part of a surface of the intermediate metal layer 905, which surfaces face each other before compression.

In the region R3, there is one metal layer interface, which is a new interface formed by the contact of at least part of the upper surface 901*a* of the outermost metal layer 901 and at least part of the lower surface 906*b* of the outermost metal layer 906, which surfaces 901*a* and 906*b* face each other before compression.

The metal layer interfaces in the sealed part 90*b* may differ from those illustrated in FIG. 5, depending on the conditions of compression. It remains the same, however, that the sealed part 90*b* includes, in a direction perpendicular to the stacking direction of the metal layers 901 through 906, three or more regions that differ in the number of metal layer interfaces in the stacking direction.

Next, a method of manufacturing a loop heat pipe according to the first embodiment is described, focusing on a process of manufacturing an inlet port. FIGS. 6A through 6D are diagrams illustrating a process of manufacturing a loop heat pipe according to the first embodiment, depicting cross sections corresponding to the cross section depicted in FIG. 5.

Figure 6A:
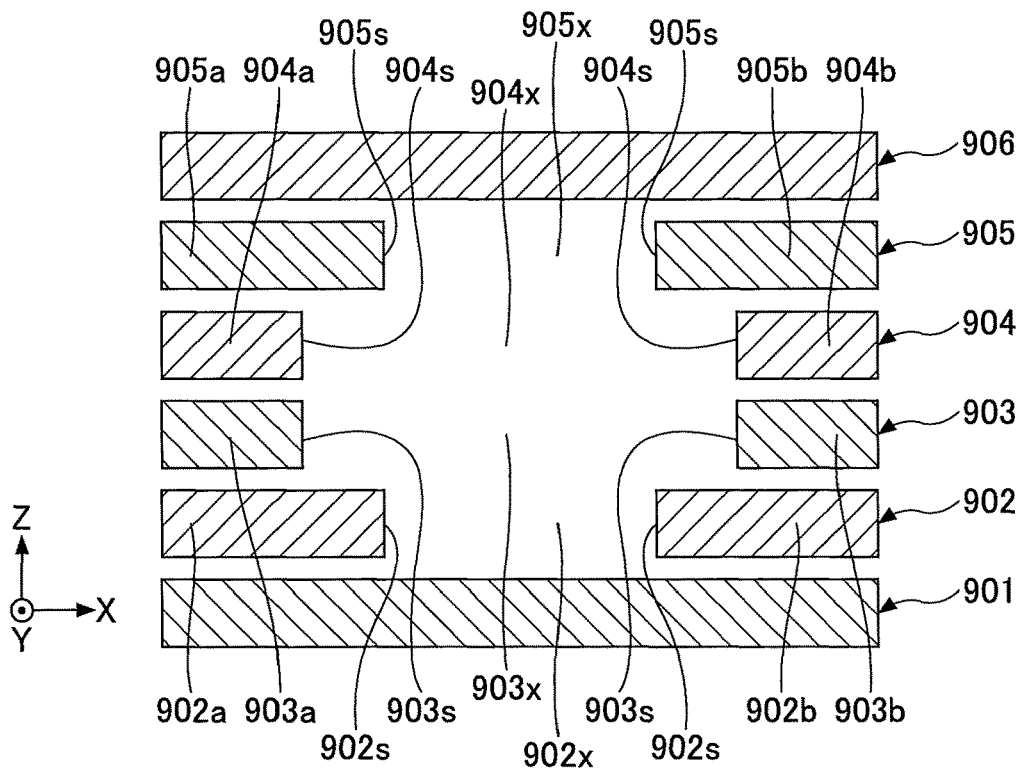
FIGS. 6A through 6D are diagrams illustrating a process of manufacturing a loop heat pipe according to the first embodiment.

First, in the process depicted in FIG. 6A, the outermost metal layers 901 and 906 having a solid shape in which no holes or grooves are formed are prepared. Furthermore, a metal sheet is prepared. Then, the opening 902*x* is formed to pierce through the metal sheet in its thickness direction (the Z-axis direction), and the walls 902*a* and 902*b* that are spaced apart laterally from each other across the opening 902*x* and are substantially parallel to each other are formed. As a result, the intermediate metal layer 902 is formed.

Likewise, another metal sheet is prepared, and the intermediate metal layer 903 including the walls 903*a* and 903*b* that are spaced apart laterally from each other across the opening 903*x* and are substantially parallel to each other is formed. Furthermore, yet another metal sheet is prepared, and the intermediate metal layer 904 including the walls 904*a* and 904*b* that are spaced apart laterally from each other across the opening 904*x* and are substantially parallel to each other is formed. In addition, still another metal sheet is prepared, and the intermediate metal layer 905 including the walls 905*a* and 905*b* that are spaced apart laterally from each other across the opening 905*x* and are substantially parallel to each other is formed.

The openings 902*x* through 905*x*, which form part of the injection channel 908, may be formed by, for example, stamping or etching. In the case of etching, when the material of metal sheets is copper, for example, a ferric chloride solution may be used as an etchant. The inner wall faces 902*s* through 905*s* of the walls 902*a* through 905*a* and 902*b* through 905*b* of the intermediate metal layers 902 through 905 may be formed to be perpendicular to the respective upper and lower surfaces of the intermediate metal layers 902 through 905, for example. Alternatively, the conditions of stamping or etching may be changed to form the inner wall faces 902*s* through 905*s* that are inclined in a predetermined direction relative to the respective upper and lower surfaces of the intermediate metal layers 902 through 905.

Figure 6B:
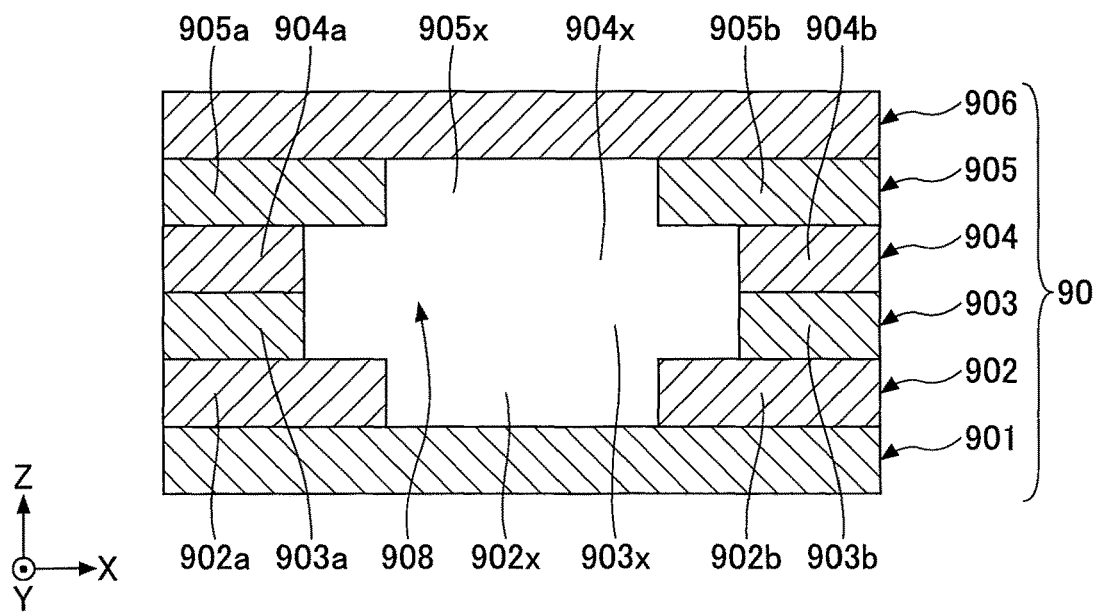

Next, in the process depicted in FIG. 6B, a structure in which the outermost metal layer 901, the intermediate metal layers 902 through 905, and the outermost metal layer 906 are successively stacked in order as illustrated in FIG. 6A is pressed and heated to be subjected to solid-state welding. As a result, adjacent metal layers are directly bonded to form the inlet port 90. At this stage, the inlet port 90 is not divided into the unsealed part 90*a* and the sealed part 90*b*. (The entirety of the inlet port 90 has the same structure as the unsealed part 90*a*.) The evaporator 10, the condenser 20, the vapor pipe 30, and the liquid pipe 40 have the same layered structure of metal layers as the inlet port 90. Therefore, the evaporator 10, the condenser 20, the vapor pipe 30, and the liquid pipe 40 are formed simultaneously with the formation of the inlet port 90. Thereafter, the liquid pipe 40 is evacuated using a vacuum pump or the like, and the working fluid C is injected into the liquid pipe 40 through the inlet port 90.

Here, solid-state welding refers to bonding objects together by softening the objects by heating the objects in a solid state without melting the objects, and further applying pressure to the objects to plastically deform the objects. To suitably bond adjacent metal layers together by solid-state welding, the metal layers 901 through 906 are preferably of the same material.

Figure 6C:
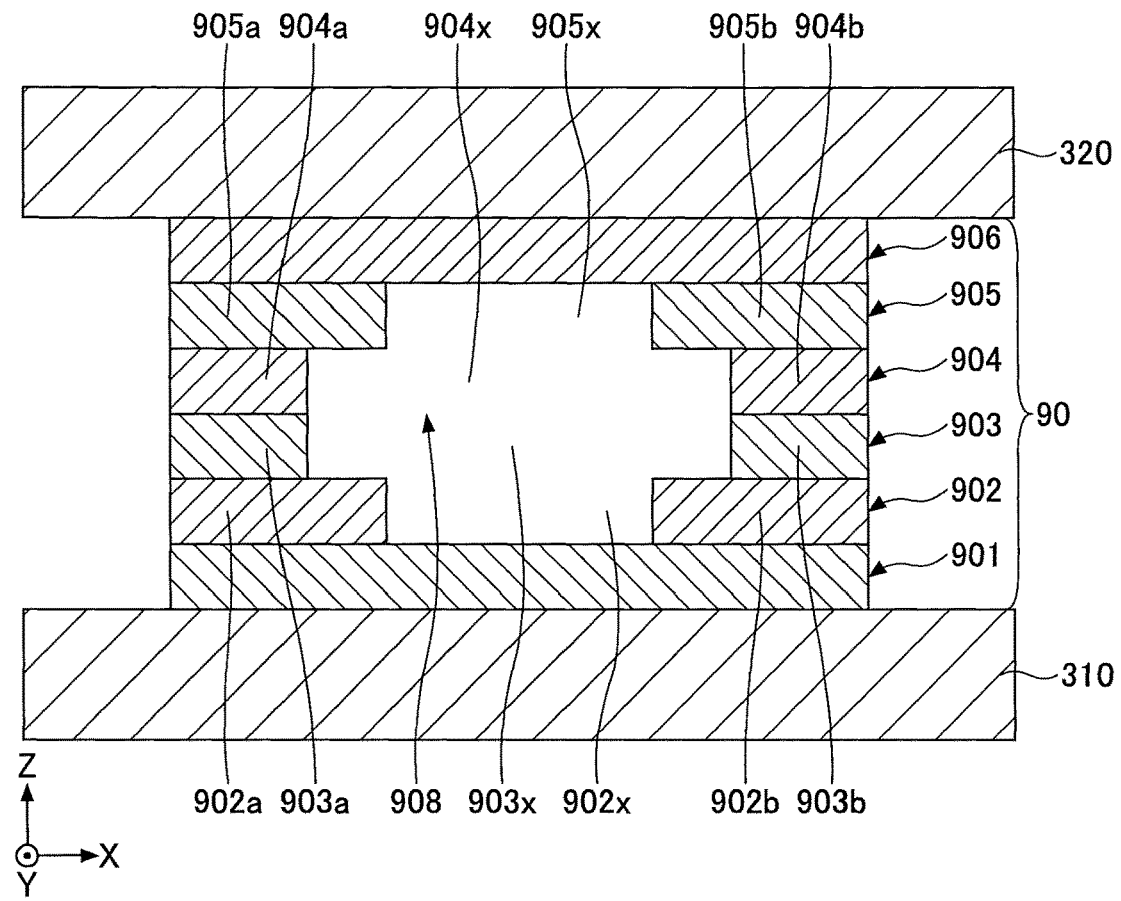
Figure 6D:
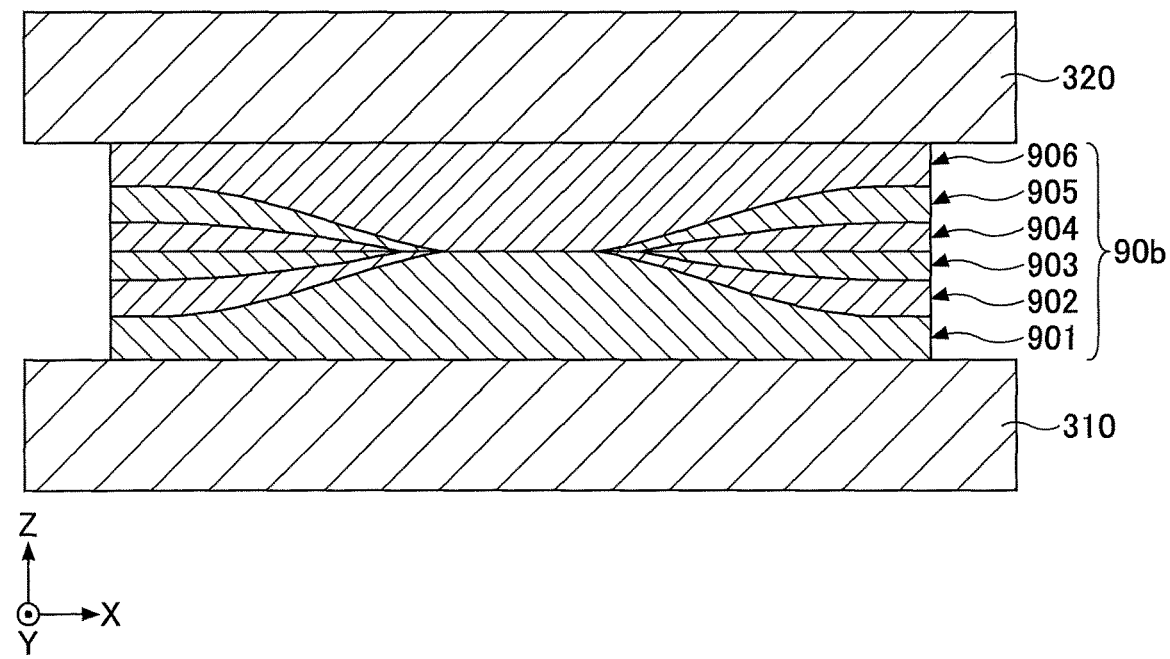

Next, in the processes depicted in FIGS. 6C and 6D, the sealed part 90*b* that hermetically seals the inlet port 90 is formed by ultrasonic welding. Specifically, as illustrated in FIG. 6C, the inlet port 90 of the structure that is formed in the process depicted in FIG. 6B and into which the working fluid C is injected is held between an anvil 310 and a horn 320. Then, while applying ultrasonic waves to the inlet port 90, the anvil 310 is moved toward the horn 320 to press at least part of the inlet port 90 upward from below, that is, in the stacking direction of the outermost metal layer 901, the intermediate metal layers 902 through 905, and the outermost metal layer 906 (in the Z direction).

As a result, as illustrated in FIG. 6D, at least part of the inlet port 90 is compressed to be flat, and each of the metal layers 901 through 906 contacts one or more of the other metal layers to form the sealed part 90b that hermetically seals the inlet port 90. By the above-described process, the loop heat pipe 1 is completed.

In the above-described process, at least part of the inlet port 90 may alternatively be compressed by moving the horn 320 toward the anvil 310 or by moving the horn 320 and the anvil 310 toward each other.

According to ultrasonic welding, by applying pressure to objects of bonding while applying ultrasonic waves to the objects, contaminations (contaminants such as an oxide film) at the interface between the objects are removed by friction. Accordingly, a clean interface is formed between the objects. This clean interface serves as a bonding starting point. The interface deforms because of the application of pressure. The deformation is promoted by the application of ultrasonic waves, and the bonding area spreads around the bonding starting point, so that strong bonding can be achieved without application of heat. Heat, however, may be applied to promote bonding.

Figure 7A:
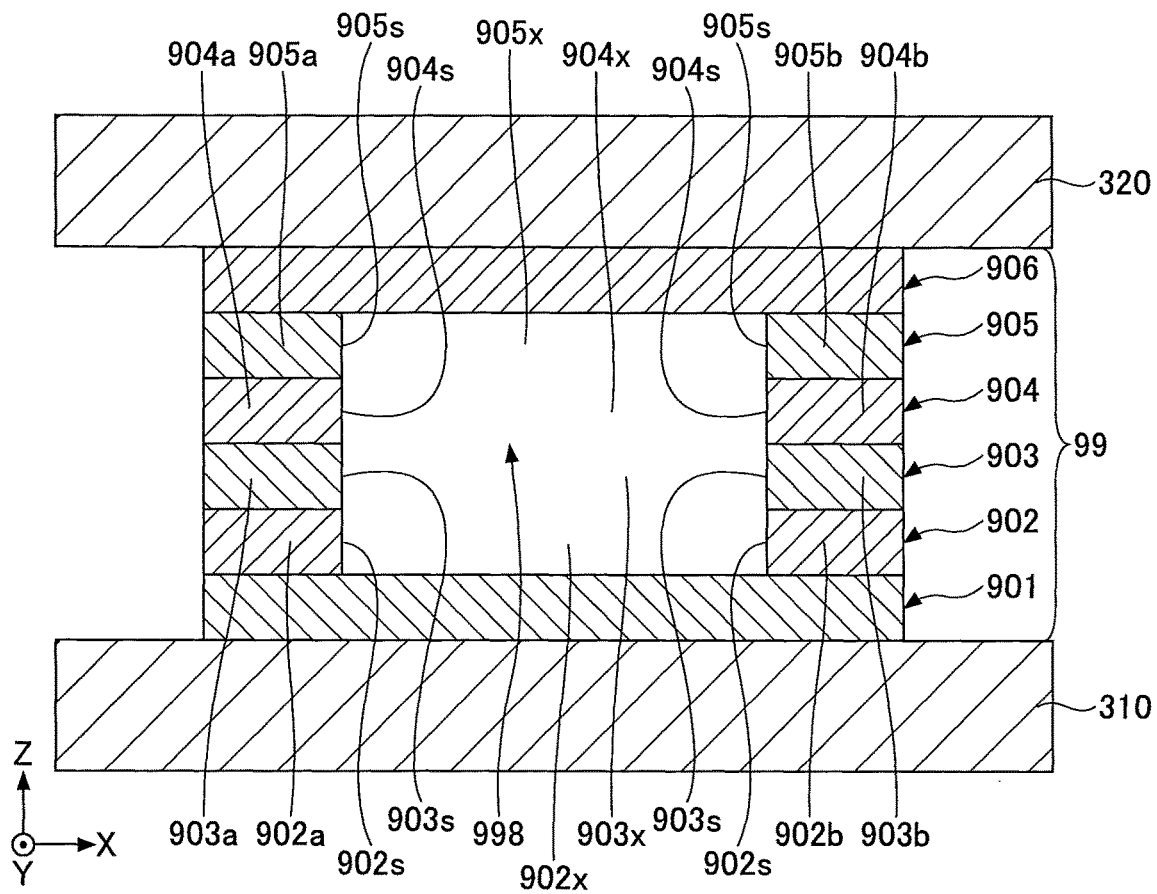
FIGS. 7A and 7B are cross-sectional views of an inlet port of a loop heat pipe according to a comparative example.
Figure 7B:
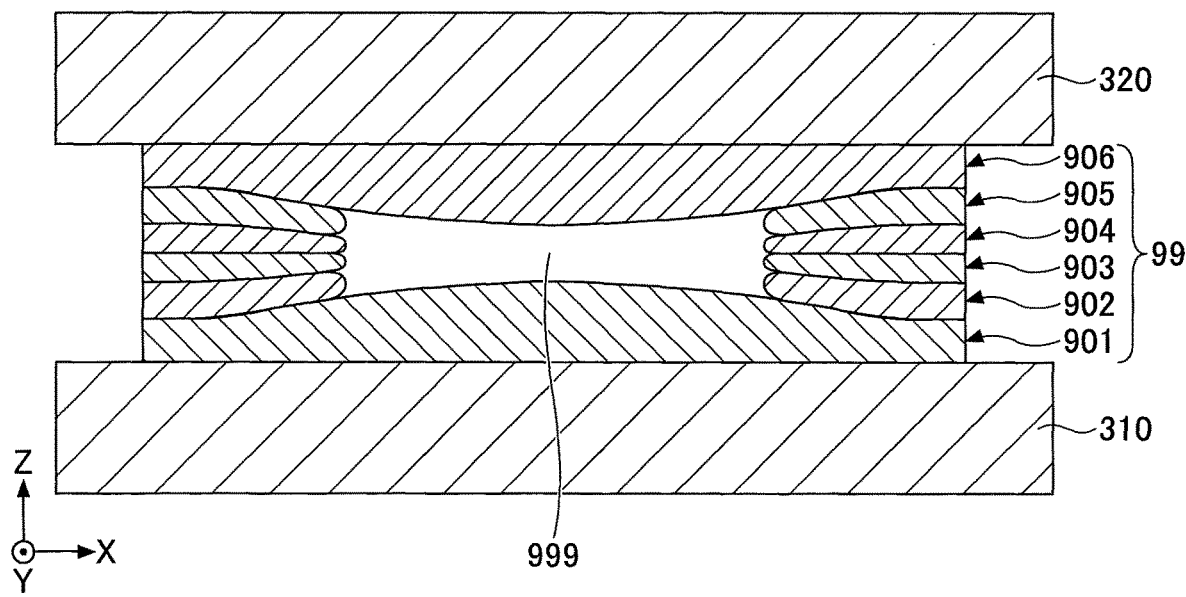

Here, an effect produced by the structure depicted in FIGS. 3 through 5 is described with reference to a comparative example. FIGS. 7A and 7B are cross-sectional views of an inlet port of a loop heat pipe according to a comparative example, illustrating a structure of the inlet port. FIGS. 7A and 7B depict cross sections corresponding to the cross sections depicted in FIGS. 6C and 6D, respectively.

An inlet port 99 illustrated in FIG. 7A is different from the inlet port 90 (FIGS. 3 through 5) in that the openings 902x through 905x are of the same size.

There is no step between any adjacent two of the inner wall face 902s of the wall 902a of the intermediate metal layer 902, the inner wall face 903s of the wall 903a of the intermediate metal layer 903, the inner wall face 904s of the wall 904a of the intermediate metal layer 904, and the inner wall face 905s of the wall 905a of the intermediate metal layer 905. Furthermore, there is no step between any adjacent two of the inner wall face 902s of the wall 902b of the intermediate metal layer 902, the inner wall face 903s of the wall 903b of the intermediate metal layer 903, the inner wall face 904s of the wall 904b of the intermediate metal layer 904, and the inner wall face 905s of the wall 905b of the intermediate metal layer 905. As a result, the inlet port 99 has a frame-like cross-sectional shape. (An injection channel 998 of the inlet port 99 has a rectangular cross-sectional shape.)

As illustrated in FIG. 7A, the inlet port 99 is held between the anvil 310 and the horn 320. Then, while applying ultrasonic waves to the inlet port 99, the anvil 310 is moved toward the horn 320 to press at least part of the inlet port 99 upward from below, that is, in the stacking direction of the outermost metal layer 901, the intermediate metal layers 902 through 905, and the outermost metal layer 906 (in the Z direction). As a result, as illustrated in FIG. 7B, at least part of the inlet port 99 is compressed to be flat.

According to the inlet port 99, however, when compressing the inlet port 99, the walls 902a through 905a and the walls 902b through 905b serve as posts to prevent the metal layers 901 through 906 from being uniformly compressed. Therefore, as illustrated in FIG. 7B, a gap 999 is likely to be formed between adjacent metal layers, thus making it difficult to hermetically seal the inlet port 99.

In contrast, according to the inlet port 90, the inner wall faces of the walls of at least two adjacent intermediate metal layers among the intermediate metal layers 902 through 905 form steps. Therefore, compared with the structure illustrated in FIGS. 7A and 7B, when forming the sealed part 90b by compressing part of the inlet port 90, each of the metal layers 901 through 906 is likely to contact one or more of the other metal layers. As a result, a gap is less likely to be formed between adjacent metal layers in the sealed part 90b, thus making it possible to improve the airtightness of the inlet port 90.

Next, a first variation of the first embodiment is described. The first variation illustrates an inlet port whose exterior wall has a different shape. In the following description, a description of the same elements or components as those of the above-described embodiment may be omitted.

Figure 8:
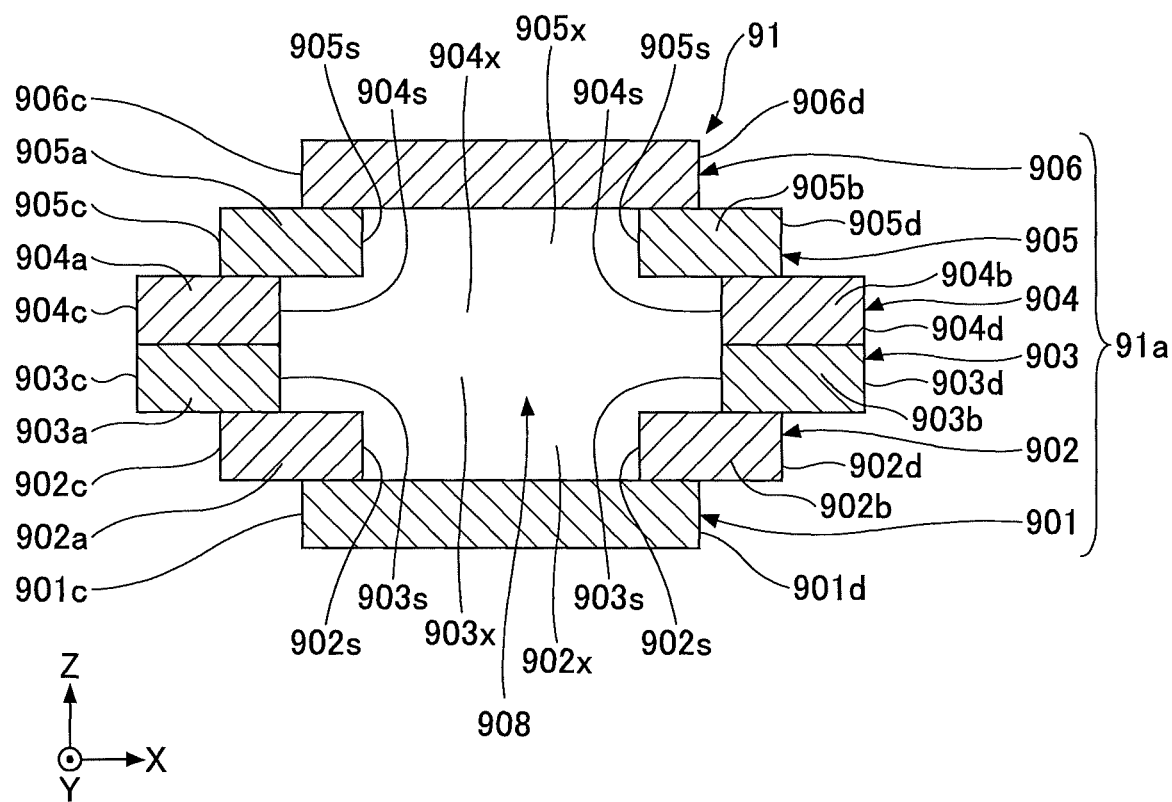
FIG. 8 is a cross-sectional view of an inlet port of the loop heat pipe according to a first variation of the first embodiment.
Figure 9:
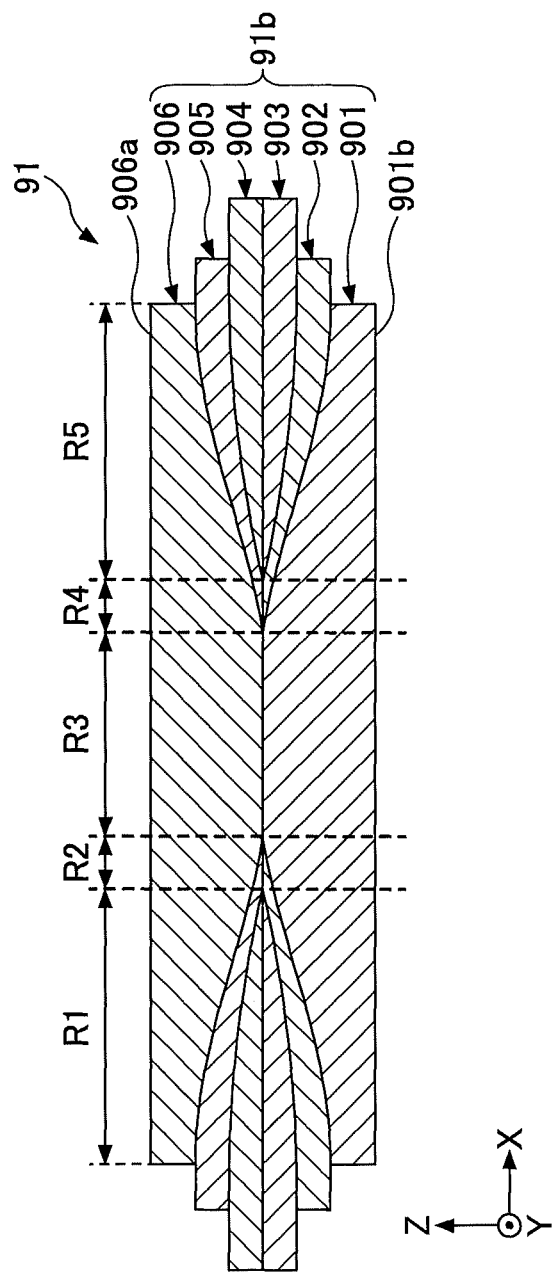
FIG. 9 is a cross-sectional view of the inlet port of the loop heat pipe according to the first variation of the first embodiment.

FIGS. 8 and 9 are cross-sectional views of an inlet port of a loop heat pipe according to the first variation, illustrating a structure of the inlet port. FIG. 8 depicts a cross section corresponding to the cross section depicted in FIG. 4. FIG. 9 depicts a cross section corresponding to the cross section depicted in FIG. 5.

Referring to FIGS. 8 and 9, the first variation is different from the first embodiment (FIGS. 3 and 4) in that the inlet port 90 (the unsealed part 90a and the sealed part 90b) is replaced with an inlet port 91 (an unsealed part 91a and a sealed part 91b).

In the unsealed part 91a of the inlet port 91, the steps of the inner wall faces 902s through 905s of the walls 902a through 905a and 902b through 905b of the intermediate metal layers 902 through 905 are the same as in the inlet port 90. That is, the injection channel 908 has the same cross-sectional shape as in the inlet port 90. On the other hand, in the unsealed part 91a of the inlet port 91, unlike in the unsealed part 90a of the inlet port 90, the outer wall faces of the walls of at least two adjacent intermediate metal layers among the intermediate metal layers 902 through 905 are laterally offset relative to each other to form a step (a stepped surface) on each side of the inlet port 91.

In the case illustrated in FIG. 8, the outer wall faces of the walls of the adjacent outermost metal layer 901 and intermediate metal layer 902 form a step on each side of the inlet port 91. Furthermore, the outer wall faces of the walls of the adjacent intermediate metal layers 902 and 903 form a step on each side of the inlet port 91. In addition, the outer wall faces of the walls of the adjacent intermediate metal layers 904 and 905 form a step on each side of the inlet port 91. Moreover, the outer wall faces of the walls of the adjacent intermediate metal layer 905 and outermost metal layer 906 form a step on each side of the inlet port 91.

To be more specific, an outer wall face 901c of the outermost metal layer 901 and an outer wall face 902c of the wall 902a of the intermediate metal layer 902 form a step. An outer wall face 901d of the outermost metal layer 901 and an outer wall face 902d of the wall 902b of the intermediate metal layer 902 form a step. The outer wall face 902c of the wall 902a of the intermediate metal layer 902 and an outer wall face 903c of the wall 903a of the intermediate metal layer 903 form a step. The outer wall face 902d of the wall 902b of the intermediate metal layer 902 and an outer wall face 903d of the wall 903b of the intermediate metal layer 903 form a step.

Furthermore, an outer wall face 904c of the wall 904a of the intermediate metal layer 904 and an outer wall face 905c of the wall 905a of the intermediate metal layer 905 form a step. An outer wall face 904d of the wall 904b of the intermediate metal layer 904 and an outer wall face 905d of the wall 905b of the intermediate metal layer 905 form a step. The outer wall face 905c of the wall 905a of the intermediate metal layer 905 and an outer wall face 906c of the outermost metal layer 906 form a step. The outer wall face 905*d* of the wall 905*b* of the intermediate metal layer 905 and an outer wall face 906*d* of the outermost metal layer 906 form a step.

The outer wall faces 901*c*, 902*c*, and 903*c* form steps like a stairway heading outward from the center of the injection channel 908. The outer wall faces 901*d*, 902*d*, and 903*d* form steps like a stairway heading outward from the center of the injection channel 908. The outer wall faces 904*c*, 905*c*, and 906*c* form steps like a stairway heading toward the center of the injection channel 908 from the outside of the inlet port 91. The outer wall faces 904*d*, 905*d*, and 906*d* form steps like a stairway heading toward the center of the injection channel 908 from the outside of the inlet port 91.

In FIG. 8, by way of example, there is no step between the outer wall face 903*c* and the outer wall face 904*c* or between the outer wall face 903*d* and the outer wall face 904*d*. Embodiments of the present invention, however, are not limited to this configuration. For example, a step may be formed between the outer wall face 903*c* and the outer wall face 904*c* and between the outer wall face 903*d* and the outer wall face 904*d*.

An unsealed part of the inlet port 91 having the same layered (laminated) structure of metal layers as the unsealed part 91*a* is compressed flat (in the Z-axis direction) into the sealed part 91*b* after injection of the working fluid C into the liquid pipe 40. The sealed part 91*b* is wider than the unsealed part 91*a* (in the X-axis direction). According to this embodiment, the shape of the sealed part 91*b* in the case of forming the sealed part 91*b* by pressing the unsealed part upward from below is illustrated. Alternatively, the sealed part 91*b* may be formed by pressing the unsealed part downward from above or by pressing the unsealed part from both above and below.

In the sealed part 91*b*, each of the metal layers 901 through 906 contacts one or more of the other metal layers to hermetically seal the inlet port 91.

The sealed part 91*b* is more easily deformable on the inner wall face side of the metal layers 901 through 906 on which side the opening is formed (that is, the injection channel 908 side) than on the outer wall face side of the metal layers 901 through 906. Therefore, many of the interfaces between metal layers ("metal layer interfaces") are inclined relative to the lower surface 901*b* of the outermost metal layer 901 and the upper surface 906*a* of the outermost metal layer 906. Furthermore, some of the metal layers 901 through 906 gradually become thinner from the outer wall face side to the inner wall face side.

The sealed part 91*b* includes three or more regions that are different in the number of metal layer interfaces in the stacking direction of the outermost metal layer 901, the intermediate metal layers 902 through 905, and the outermost metal layer 906 (that is, in the Z direction). The three or more regions are arranged laterally or in a direction perpendicular to the stacking direction (namely, in the X-axis direction). Specifically, the sealed part 91*b* includes the same regions R1 through R5 as the sealed part 90*b* illustrated in FIG. 5.

Furthermore, in the sealed part 91*b*, while a portion laterally outside the regions R1 and R5 has substantially the same shape as before compression, the intermediate metal layers 902 through 905 are flattened in the regions R1, R2, R4 and R5.

The metal layer interfaces in the sealed part 91*b* may differ from those illustrated in FIG. 9, depending on the conditions of compression. It remains the same, however, that the sealed part 91*b* includes, in a direction perpendicular to the stacking direction of the metal layers 901 through 906, three or more regions that differ in the number of metal layer interfaces in the stacking direction.

The outer wall faces of at least two adjacent metal layers among the metal layers 901 through 906 may form steps as in the inlet port 91.

Next, a second variation of the first embodiment is described. The second variation illustrates an inlet port that is compressed in its entirety. In the following description, a description of the same elements or components as those of the above-described embodiment may be omitted.

Figure 10:
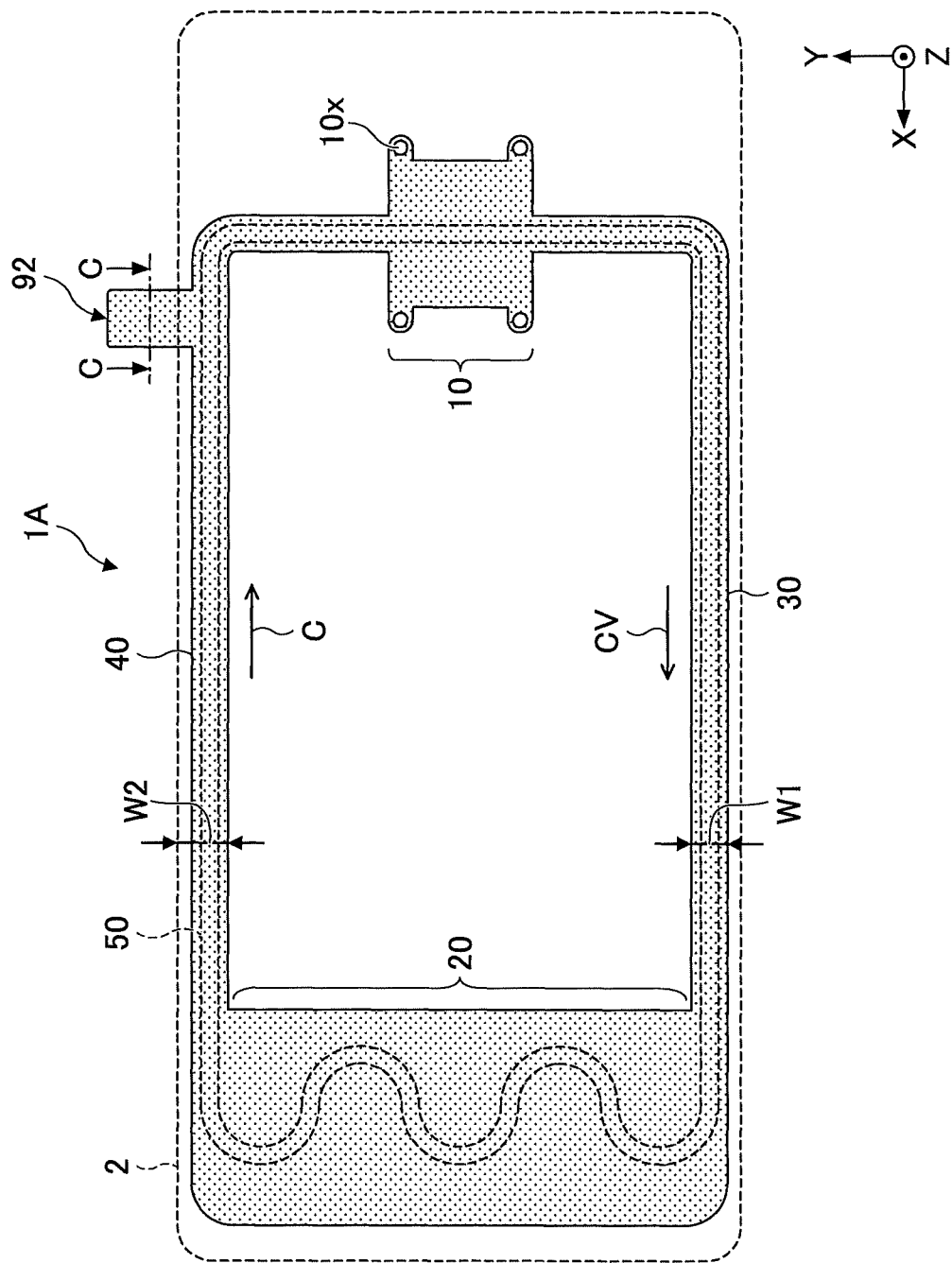
FIG. 10 is a schematic plan view of a loop heat pipe according to a second variation of the first embodiment.

FIG. 10 is a schematic plan view of a loop heat pipe according to the second variation. Referring to FIG. 10, a loop heat pipe 1A according to the second variation is different from the loop heat pipe 1 in that the inlet port 90 is replaced with an inlet port 92.

The inlet port 92 has the same structure as the sealed part 90*b* of the inlet port 90. Accordingly, a cross section taken along the line C-C of FIG. 10 exhibits the same structure as in FIG. 5.

An inlet port compressed in its entirety to be formed only of a sealed part without having an unsealed part like the inlet port 92 also produces the same effect as the inlet port 90. The inlet port 91 of the first variation as well may be compressed in its entirety to be formed only of the sealed part 91*b* to produce the same effect as the inlet port 90.

[b] Second Embodiment

A second embodiment illustrates a flat heat pipe. In the following description, a description of the same elements or components as those of the above-described embodiment may be omitted.

Figure 11A:
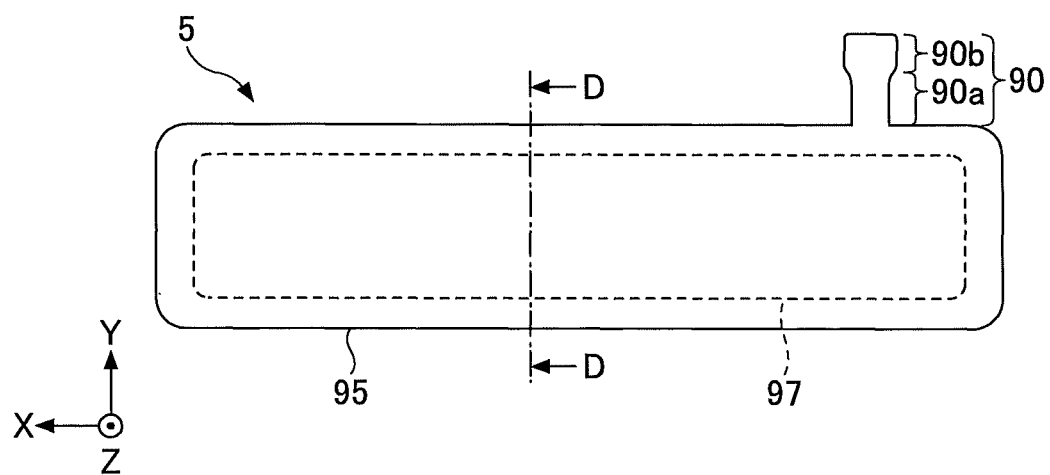
FIGS. 11A and 11B are diagrams illustrating a flat heat pipe according to a second embodiment.
Figure 11B:
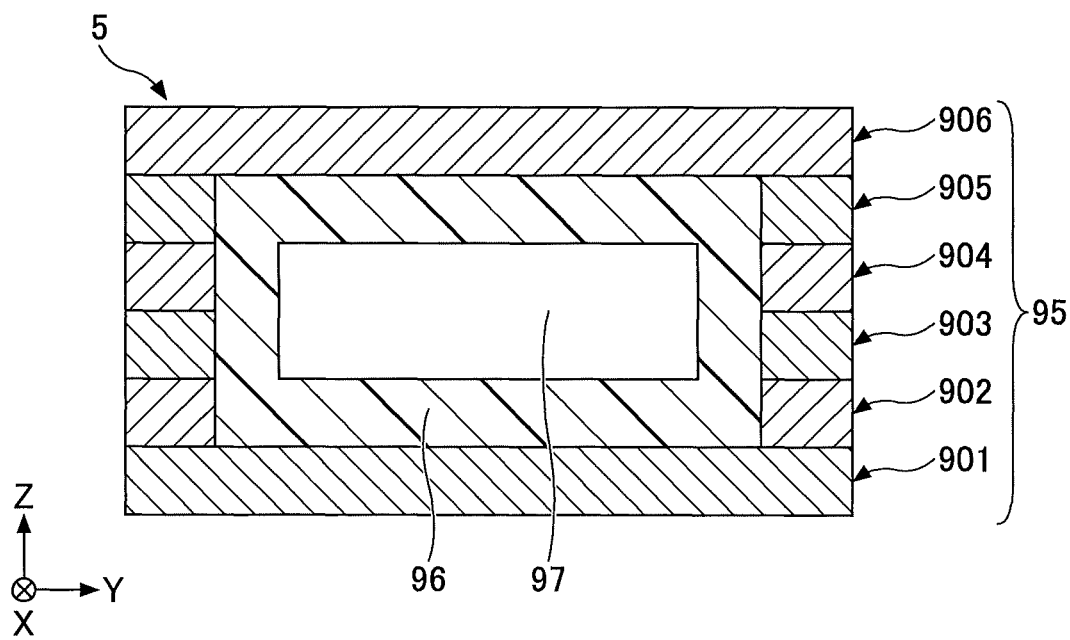

FIGS. 11A and 11B are diagrams illustrating a flat heat pipe according to the second embodiment. FIG. 11A is a schematic plan view of the flat heat pipe. FIG. 11B is a cross-sectional view of the flat heat pipe, taken along the line D-D of FIG. 11A.

Referring to FIGS. 11A and 11B, a flat heat pipe 5 according to the second embodiment includes an outer casing 95 and a wick 96 provided on the inner wall face of the outer casing 95. A vapor flow path 97 is formed inside the wick 96. The wick 96 has a capillary force to return a working fluid condensed in a heat releasing part to an evaporation part. The working fluid turned into vapor in the evaporation part travels to the heat releasing part through the vapor flow path 97.

In the flat heat pipe 5, a part of the outer casing 95 on which a heat generating component such as a semiconductor device is placed serves as the evaporation part (a heat generating part), a part of the outer casing 95 distant from the evaporation part serves as the heat releasing part, and a part of the outer casing 95 between the evaporation part and the heat releasing part serves as a thermal insulation part. For example, when a heat generating component is placed on a part of the outer casing 95 near its right end in FIG. 11A, the part serves as the evaporation part. Accordingly, a part of the outer casing 95 near its left end serves as the heat releasing part, and a part of the outer casing 95 around its center serves as the thermal insulation part.

For example, the outer casing 95 may have a structure in which the six layers of the outermost metal layer 901, the intermediate metal layers 902 through 905, and the outermost metal layer 906 are successively stacked in order. The number of metal layers to be stacked, however, is not limited to six, and may be at least four. That is, at least two intermediate metal layers may be stacked between the two outermost metal layers.

The inlet port 90 for injecting a working fluid into the wick 96 extends (protrudes) from the outer casing 95. The inlet port 90 may include the unsealed part 90a and the sealed part 90b as illustrated in FIGS. 3 through 5.

Thus, in the flat heat pipe 5 as well, the same effect as in the first embodiment is produced by providing the inlet port 90. In place of the inlet port 90, the inlet port 91 (FIGS. 8 and 9) or an inlet port formed only of the sealed part 90b or 91b (FIG. 10) may be provided. In this case as well, the same effect as in the case of providing the inlet port 90 is produced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

Various aspects of the subject-matter described herein may be set out non-exhaustively in the following numbered clauses:

1. A method of manufacturing a heat pipe including an inlet port for injecting a working fluid, the method including:
   forming the inlet port,
   forming the inlet port includes
   forming a first metal layer by processing a first metal sheet to form a first opening and a plurality of walls spaced apart from each other across the first opening in the first metal sheet;
   forming a second metal layer by processing a second metal sheet to form a second opening and a plurality of walls spaced apart from each other across the second opening in the second metal sheet;
   preparing a first outermost metal layer and a second outermost metal layer;
   stacking the first and second metal layers between the first and second outermost metal layers;
   bonding each two adjacent metal layers among the first and second outermost metal layers and the first and second metal layers; and
   sealing the inlet port after injecting the working fluid, sealing the inlet port including applying a pressure to at least a part of the inlet port in at least one of a stacking direction of the first and second outermost metal layers and the first and second metal layers and a direction opposite to the stacking direction to flatten the part of the inlet port, so that each of the first and second outermost metal layers and the first and second metal layers contacts one or more of other metal layers among the first and second outermost metal layers and the first and second metal layers to hermetically seal the inlet port.

2. The method of clause 1, wherein sealing the inlet port further includes applying ultrasonic waves to the part of the inlet port while applying the pressure to the part of the inlet port in at least one of the stacking direction and the direction opposite to the stacking direction to flatten the part of the inlet port.

What is claimed is:
1. A heat pipe comprising:
   an evaporator configured to vaporize a working fluid;
   a condenser configured to condense the vaporized working fluid;
   a liquid pipe connecting the evaporator and the condenser;
   a vapor pipe connecting the evaporator and the condenser, the vapor pipe forming a loop with the liquid pipe; and
   an inlet port for injecting the working fluid, the inlet port protruding from a wall of the liquid pipe or the vapor pipe, the inlet port including an unsealed part and a sealed part that connect to each other, the unsealed part and the sealed part including a plurality of metal layers, the plurality of metal layers being a first outermost layer, a plurality of intermediate layers stacked on the first outermost layer, and a second outermost layer stacked on the plurality of intermediate layers,
   wherein, in the unsealed part,
   the plurality of intermediate layers include respective openings open to the first and second outermost layers, and respective first and second walls on first and second opposite sides, respectively, of the openings,
   the openings of the plurality of intermediate layers form an injection channel defined by the first and second outermost layers and the first and second walls of the plurality of intermediate layers, and
   inner wall faces of the first walls and inner wall faces of the second walls of at least two adjacent intermediate layers among the plurality of intermediate layers form a first step and a second step, respectively, and
   wherein, in the sealed part, each of the plurality of metal layers contacts one or more of other metal layers among the plurality of metal layers to hermetically seal the inlet port.

2. The heat pipe as claimed in claim 1, wherein, in the unsealed part,
   the plurality of intermediate layers include a first intermediate layer and a second intermediate layer that are adjacent to each other, the first intermediate layer being closer to the first outermost layer than is the second intermediate layer,
   a distance between the first and second walls of the second intermediate layer is greater than a distance between the first and second walls of the first intermediate layer,
   the plurality of intermediate layers include a third intermediate layer and a fourth intermediate layer that are adjacent to each other, the third intermediate layer being closer to the first outermost layer than is the fourth intermediate layer, and
   a distance between the first and second walls of the fourth intermediate layer is smaller than a distance between the first and second walls of the third intermediate layer.

3. The heat pipe as claimed in claim 1, wherein outer wall faces of at least two adjacent metal layers among the plurality of metal layers form a step.

4. A heat pipe comprising:
   an evaporator configured to vaporize a working fluid;
   a condenser configured to condense the vaporized working fluid;
   a liquid pipe connecting the evaporator and the condenser;
   a vapor pipe connecting the evaporator and the condenser, the vapor pipe forming a loop with the liquid pipe; and
   an inlet port for injecting the working fluid, the inlet port protruding from a wall of the liquid pipe or the vapor pipe, the inlet port including an unsealed part and a sealed part that connect to each other, the unsealed part and the sealed part including a plurality of metal layers, the plurality of metal layers being a first outermost layer, a plurality of intermediate layers stacked on the first outermost layer, and a second outermost layer stacked on the plurality of intermediate layers, wherein, in the unsealed part, the plurality of intermediate layers include respective openings open to the first and second outermost layers, and respective first and second walls on first and second opposite sides, respectively, of the openings, and the openings of the plurality of intermediate layers form an injection channel defined by the first and second outermost layers and the first and second walls of the plurality of intermediate layers, wherein, in the sealed part, each of the plurality of metal layers contacts one or more of other metal layers among the plurality of metal layers to hermetically seal the inlet port, and wherein the inlet port includes at least three regions that are different in a number of interfaces of metal layers in a stacking direction of the plurality of metal layers, the at least three regions being arranged in a direction perpendicular to the stacking direction.

5. The heat pipe as claimed in claim 4, wherein, in the unsealed part, the plurality of intermediate layers include a first intermediate layer and a second intermediate layer that are adjacent to each other, the first intermediate layer being closer to the first outermost layer than is the second intermediate layer, a distance between the first and second walls of the second intermediate layer is greater than a distance between the first and second walls of the first intermediate layer, the plurality of intermediate layers include a third intermediate layer and a fourth intermediate layer that are adjacent to each other, the third intermediate layer being closer to the first outermost layer than is the fourth intermediate layer, and a distance between the first and second walls of the fourth intermediate layer is smaller than a distance between the first and second walls of the third intermediate layer.

6. The heat pipe as claimed in claim 4, wherein outer wall faces of at least two adjacent metal layers among the plurality of metal layers form a step.

* * * * *